J. R. GRUNDY.
FLEXIBLE COUPLING.
APPLICATION FILED FEB. 18, 1915.
1,181,872. Patented May 2, 1916.
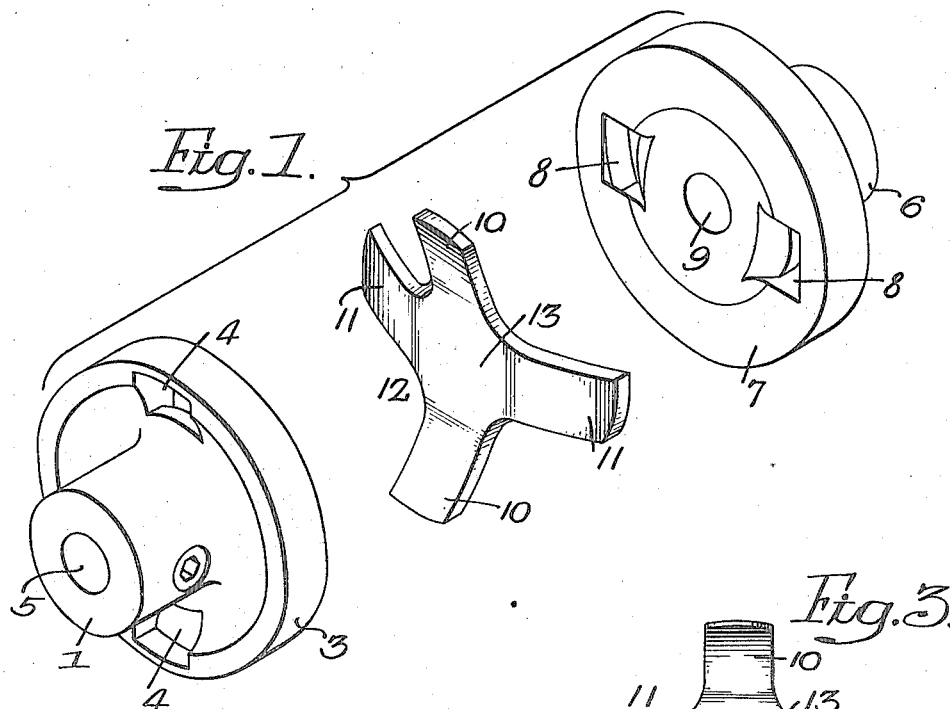
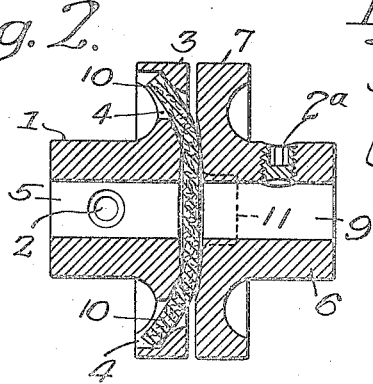
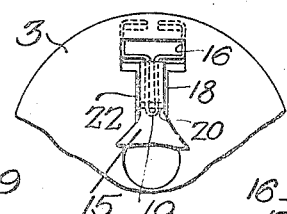
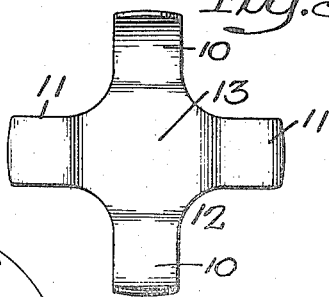
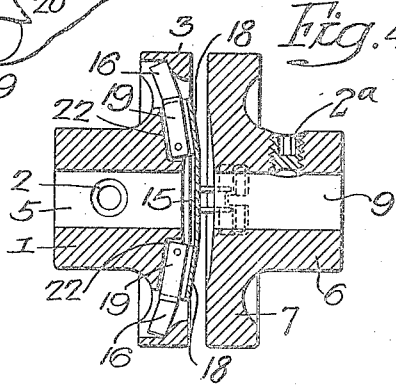
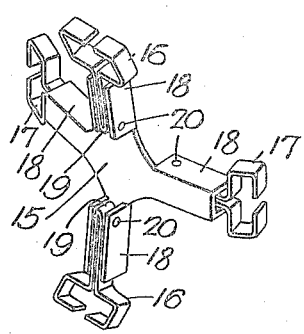
Witnesses:—
Charles H. York.
[signature]
Inventor:—
John R. Grundy.
by his Attorneys
Howson & Howson

UNITED STATES PATENT OFFICE.

JOHN R. GRUNDY, OF PHILADELPHIA, PENNSYLVANIA.

FLEXIBLE COUPLING.

1,181,872.      Specification of Letters Patent.      Patented May 2, 1916.

Application filed February 18, 1915. Serial No. 9,102.

*To all whom it may concern:*

Be it known that I, JOHN R. GRUNDY, a citizen of the United States, residing in Philadelphia, Pennsylvania, have invented certain Improvements in Flexible Couplings, of which the following is a specification.

One object of my invention is to provide a relatively simple and inexpensive combination of parts for effectively transmitting power from a driving to a driven shaft, even if these are out of line and under operating conditions have considerable relative longitudinal movement;—the invention contemplating an arrangement of parts which shall be durable, easily applied, and not likely to require attention or repair.

These objects and other advantageous ends I attain as hereinafter set forth, reference being had to the accompanying drawings in which, Figure 1 is a detached perspective view of a coupling constructed according to my invention; Fig. 2 is a longitudinal vertical section of the coupling shown in Fig. 1; Fig. 3 is a plan of the intermediate coupling member; Fig. 4 is a vertical longitudinal section of a slightly modified form of my coupling; Fig. 5 is a perspective view of that form of intermediate coupling member used in the combination shown in Fig. 4; and Fig. 6 is a fragmentary elevation of one of the coupling disks and part of one of its coacting arms.

In Figs. 1 to 3 of the above drawings, 1 represents a sleeve designed to be fixed to the end of a shaft by means of a set screw 2 and provided with a disk-like flange 3. This latter has two openings 4 at diametrically opposite points on its face and as will be noted particularly from Fig. 2 each of these extends in a line inclined to the center line of the shaft receiving passage 5 of its sleeve 1. A similar sleeve 6 having a disk-like flange 7 is designed to be fixed to a second shaft by a set screw 2ª and it likewise has in its face a pair of diametrically opposite openings 8 extending outwardy therefrom in lines which, like those of the openings 4, extend at about an angle of 60 degrees to the line of the shaft receiving passage 9 formed through the sleeve 6. The openings 4 and 8 are preferably parallel sided and are designed for the reception of the two pairs of arms 10 and 11 respectively of a cross shaped piece 12 of sheet leather. These arms radiate from a body portion 13 in lines at right angles to each other and they are preferably treated by suitable means as by a chemical process in order that they may be relatively hard as compared with said body to which they are flexibly connected, their width being such that they closely, though movably, fit into the openings 4 and 8. The adjacent faces of the flanged portions 3 and 7 are preferably recessed or made concave so that when the body portion 13 is mounted between them with its arms in the openings 4 and 8, said flanges may approach closely to each other, it being noted that while the arms 10 are bent outwardly in one direction from the plane of the body 13 so as to properly fit into the openings 4, the arms 11 are similarly bent outwardly on the opposite side of said plane so as to fit into the openings 8.

Under conditions of use, the sleeves 1 and 6 are fixed respectively to the adjacent ends of two shafts to be coupled and the arms 10 are entered in the openings 4 of the sleeve 1 for example. Thereafter the arms 11 are similarly entered in the openings 8, thus coupling the two shaft carried sleeves so that power may be transmitted from one of them through the leather piece to the other. With this arrangement of parts it is by no means necessary that the two shafts on which the sleeves are fixed should be in line with each other, since the arms of the flexible member 12 act as if they were hinged to the body 13 and fulfil their functions satisfactory even though the above noted condition exists. By having said arms hardened by suitable chemical or other treatment, any possibility of their lateral failure under operating conditions is avoided and obviously the shafts may move longitudinally toward and from each other so as to vary the distance between the flanges 3 and 7 without interfering with the transmission of power between them, since the arms 10 and 11 may move into and out of their respective openings 4 and 8 and still bear upon the flat sides thereof sufficiently to operatively connect the parts.

While I preferably employ a body of leather for coupling the two flanges 3 and 7, it is to be understood that any other sheet or flat body of material may be employed, even though it should be less flexible than the leather, and moreover, as shown in Figs. 4 to 6 inclusive, I may employ a body portion 15 of sheet, wrought or cast metal and hinge to this a plurality of arms 16 and 17 which functionally are practically identical with the arms 10 and 11, since they are flexibly connected to said body. In this case, however, I preferably provide the body with rigid integral arms 18 of channel section and in these pivot or hinge the stem portions 19 of the arms 16 and 17, by pivot pins 20 extending between the opposite walls of said arms.

Each of the arms 16 and 17 is made of a single length of more or less springy strip or sheet material having its narrow stem 19 provided with a head portion preferably of open rectangular form and so made that the free ends of the strip are spaced apart as shown. It will be understood that the two lengths of material constituting the stem 19 while parallel, are preferably separated so that the two sides of the head are free to move toward each other, and thereafter tend to return to their normal positions. The flanged sleeves 1 and 6 used with this form of my invention are practically of the same construction as those used with the leather piece 12, except that a groove 22 is provided leading from each of the openings 4 and 8 toward the center line of the sleeve for the reception of the channel-shaped arms 18 of the body 15. It is noted, however, that said arms do not engage the walls of these grooves, since the power is transmitted from or to the body through the heads of the hinged arms 16 and 17 which are inserted in the openings 4 and 8 so as to engage the sides thereof. By reason of the fact that the two parts of each head are free to move toward and from each other as above described, a yielding connection is provided between the body 15 and each of the flanges 3 or 7, as the case may be, so that the likelihood of injury from sudden variation of load is reduced to a minimum. As before, the two sleeves 1 and 6 and consequently the shafts to which they are attached, may move longitudinally without interfering with the proper operation of the coupling, whose construction is such that it is also permissible for said shafts to be more or less out of line.

It is particularly to be noted that by reason of the shape of the passages 4 and 8 as well as because of the shape and tendency to remain flat possessed by the intermediate member, the latter continues in power transmitting engagement with the two shaft carried members regardless of their movement toward and from each other.

I claim:—

1. The combination of two sleeves, each having a flange provided with openings; with an intermediate member having longitudinally flexible arms respectively extending into the openings of said flanges.

2. The combination of two plates each having openings; with a body of sheet material having a plurality of arms flexibly connected thereto, certain of the arms extending loosely into the openings in one of said plates and others of said arms extending into the openings of the other plate.

3. The combination of two sleeves, each having a flange provided with diametrically opposite openings extending in lines at an angle to the line of the passage through its sleeve; with an intermediate member having arms flexibly connected thereto and extending in lines substantially at right angles to each other into the openings of the flanges respectively.

4. The combination of two sleeves, each having a flange provided with an opening; with a body of flexible material mounted between said flanges and having relatively movable arms respectively projecting into the openings of the flanges.

5. The combination of two sleeves, each having a flange provided with a pair of diametrically opposite openings extending in lines inclined to the line of its sleeve; and a cruciform body of material mounted between said flanges, with one pair of longitudinally flexible arms extending into the openings of one flange and a second pair of longitudinally flexible arms extending into the openings of the second flange.

6. The combination of two sleeves, each having a flange provided with a pair of diametrically opposite openings extending in lines inclined to the line of its sleeve; with a cruciform body of material mounted between said flanges, having one pair of its arms extending into the openings of one flange and a second pair of arms extending into the openings of the second flange, said arms being harder than the remainder of the body.

7. A shaft coupling including plates having means for respectively connecting them to shafts to be coupled, and each provided with a plurality of openings; with a cruciform body of leather mounted between said plates, having longitudinally flexible arms of which certain extend into the openings of one plate and others of its arms extending into the openings of the other plate.

8. A shaft coupling including plates having means for respectively connecting them to shafts to be coupled, and each provided with a plurality of openings; with a cruciform body of leather mounted between said plates, having certain of its arms extending into the openings of one plate and others of its arms extending into the openings of the other plate, said arms being chemically treated to cause them to be harder than the remainder of said leather body.

9. A shaft coupling including two sleeves, each provided with a concaved disk having openings; with a body of material between the disks, having two sets of arms flexibly connected to it and respectively projecting into the openings of said flanges.

10. The combination of two members for connection respectively to two shafts to be coupled; with an intermediate member consisting of an integral cross shaped body of leather having its arms bent in two sets to opposite sides of its general plane and fitting openings in said two members respectively.

In testimony whereof, I have signed my name to this specification, in the presence of two subscribing witnesses.

JOHN R. GRUNDY.

Witnesses:
WILLIAM E. BRADLEY,
WM. A. BARR.